United States Patent
Yang et al.

(10) Patent No.: US 12,323,543 B2
(45) Date of Patent: Jun. 3, 2025

(54) ADAPTER AND MOBILE DEVICE

(71) Applicant: Beijing Xiaomi Mobile Software Co., Ltd., Beijing (CN)

(72) Inventors: Zongbao Yang, Beijing (CN); Wei Liu, Beijing (CN); Yan Zheng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 447 days.

(21) Appl. No.: 17/825,776

(22) Filed: May 26, 2022

(65) Prior Publication Data

US 2023/0208955 A1 Jun. 29, 2023

(30) Foreign Application Priority Data

Dec. 29, 2021 (CN) .......................... 202111642859.9

(51) Int. Cl.
*H04M 1/02* (2006.01)
*H04N 23/51* (2023.01)
*H04N 23/55* (2023.01)

(52) U.S. Cl.
CPC .......... *H04M 1/0264* (2013.01); *H04N 23/51* (2023.01); *H04N 23/55* (2023.01)

(58) Field of Classification Search
None
See application file for complete search history.

(56) References Cited

U.S. PATENT DOCUMENTS

| 2015/0042877 | A1 | 2/2015 | O'Neill et al. |
| 2017/0031236 | A1* | 2/2017 | O'Neill ................. G03B 17/14 |
| 2018/0045910 | A1* | 2/2018 | O'Neill ................. G02B 7/023 |

FOREIGN PATENT DOCUMENTS

| CN | 107517288 A | 12/2017 |
| EP | 3101473 A1 | 12/2016 |

OTHER PUBLICATIONS

Adriano Lolli, "IMAGINGSOURCE adapter C mount for lens M42, Nikon, Canon, Contax, Pentax, Olympus Coma" No. XP055974318 (Aug. 13, 2009).
Extended European Search Report dated Nov. 4, 2022 for European Patent Application No. 22176473.1.

* cited by examiner

*Primary Examiner* — Frantz Bataille
(74) *Attorney, Agent, or Firm* — Volpe Koenig (57) ABSTRACT

The disclosure provides an adapter. The adapter includes a first connection structure and a second connection structure, wherein the first connection structure is capable of being assembled and matched with an external lens, such that an access plane of the external lens matches with a preset end surface of a light passing channel, and the second connection structure is capable of being assembled and matched with a mobile terminal, such that a distance between the preset end surface and a photosensitive plane is equal to a flange focal length of the external lens.

18 Claims, 8 Drawing Sheets

ADAPTER AND MOBILE DEVICE

CROSS REFERENCE TO RELATED APPLICATIONS

The present application claims the benefit of priority to Chinese Application No. 2021116428599, filed on Dec. 29, 2021, the contents of which are incorporated herein by reference in their entireties for all purposes.

BACKGROUND

In the related art, the structure size of a built-in camera module of a mobile terminal is limited by the overall size of the mobile terminal. If the overall layout factor of the mobile terminal is considered, the function and imaging quality of the built-in camera module cannot be improved. If the thickness of the camera module is large, the overall thickness of the mobile terminal is correspondingly large, and the aesthetics and use experience are reduced by the bulkiness of the mobile terminal. Therefore, how to balance the shooting quality of a camera module and the lightness and thinness of a mobile terminal has become a hot issue in the current field.

SUMMARY

The disclosure relates to the technical field of electronics, and in particular to an adapter and a mobile device.

A first aspect of the disclosure provides an adapter for detachably assembling an external lens to a mobile terminal to make the external lens cooperate with an image sensor assembly of the mobile terminal for use, the adapter includes:

a main body structure defining a light passing channel;

a first connection structure, provided in the main body structure and located at a first end of the light passing channel, and used for positioning and mounting the external lens to the first end, such that an access plane of the external lens matches with a preset end surface of the first end; and a second connection structure, provided in the main body structure and located at a second end of the light passing channel, and used for positioning and mounting the adapter to the mobile terminal, such that a distance between the preset end surface and a photosensitive plane of the image sensor assembly is equal to a flange focal length of the external lens.

It should be understood that the above general descriptions and the following detailed descriptions are only examples, and cannot limit the disclosure.

DETAILED DESCRIPTION

Embodiments will be described in detail here, and examples thereof are shown in the accompanying drawings. When the following descriptions refer to the drawings, the same numbers in different drawings indicate the same or similar elements, unless otherwise indicated. The implementation manners described in the following embodiments do not represent all implementation manners consistent with the disclosure. Instead, they are merely examples of apparatuses and methods consistent with some aspects of the disclosure.

The terms used in the disclosure are merely for the purpose of describing specific embodiments, and are not intended to limit the disclosure. Technical or scientific terms used in the disclosure should have the ordinary meanings as understood by those of ordinary skill in the art to which the disclosure belongs, unless otherwise defined. The terms "first", "second" and the like used in the disclosure do not indicate any sequence, quantity or importance, and are merely used to distinguish between different components. Likewise, the terms "one" or "a/an" and the like do not indicate a limitation of quantity, but rather indicates the presence of at least one, and if only "one" is referred to, it will be stated separately. "A plurality of" or "several" indicates two or more. Unless otherwise indicated, the terms "front", "back", "lower" and/or "upper", "top", "bottom" and the like are used for ease of description and are not limited to one position or one spatial orientation. The terms "comprise" or "include" and the like are intended to indicate that an element or item preceding a "comprise" or an "include" encompasses the elements or items listed following the "comprise" or the "include", and equivalents thereof, but does not exclude another element or item. The terms "connected to" or "in connection with" and the like are not limited to physical or mechanical connections, and may include electrical connections, whether direct or indirect.

In the related art, the structure size of a built-in camera module of a mobile terminal is limited by the overall size of the mobile terminal. If the overall layout factor of the mobile terminal is considered, the function and imaging quality of the built-in camera module cannot be improved. If the thickness of the camera module is large, the overall thickness of the mobile terminal is correspondingly large, and the aesthetics and use experience are reduced. Therefore, how to balance the shooting quality of a camera module and the lightness and thinness of a mobile terminal has become a hot issue in the current field.

The disclosure provides an improved adapter and mobile device to achieve a positioning connection between an external lens and a mobile terminal, such that the mobile terminal has both lightness and thinness and an expected shooting effect.

Figure 1:
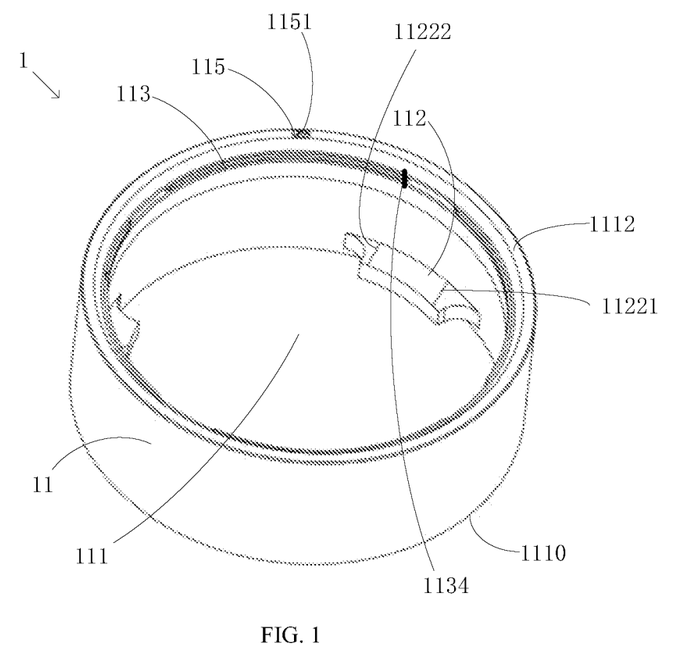
FIG. 1 is a first schematic structural diagram of an adapter in an embodiment of the disclosure.
Figure 2:
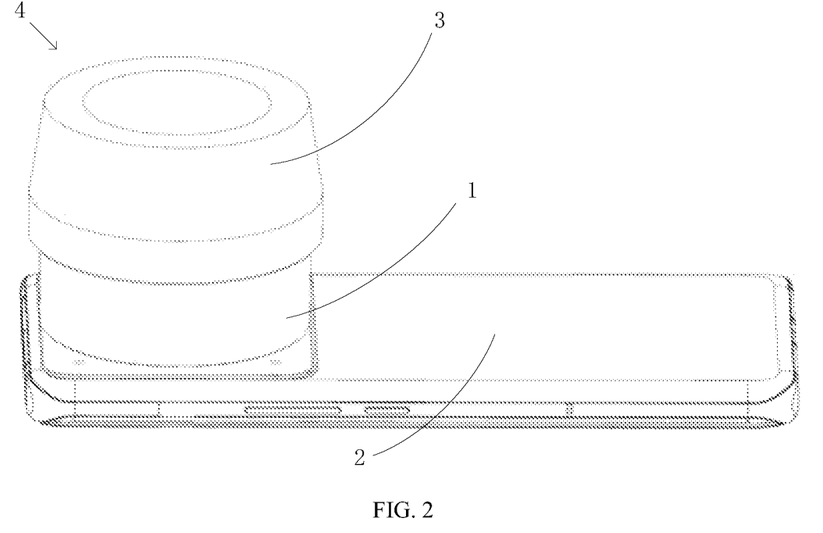
FIG. 2 is a schematic stereoscopic structural diagram of an assembly of a mobile terminal, an adapter and an external lens in an embodiment of the disclosure.
Figure 3:
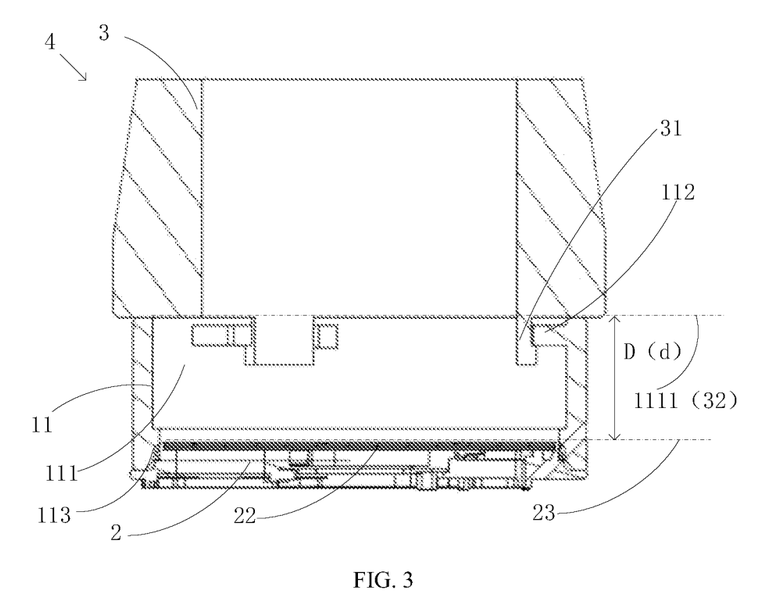
FIG. 3 is a schematic cross-sectional structural diagram of an assembly of a mobile terminal, an adapter and an external lens in an embodiment of the disclosure.

The disclosure provides an adapter for detachably assembling an external lens to a mobile terminal to make the external lens cooperate with an image sensor assembly of the mobile terminal for use. FIG. 1 is a schematic structural diagram of an adapter in an embodiment of the disclosure; FIG. 2 is a schematic stereoscopic structural diagram of an assembly of a mobile terminal, an adapter and an external lens in an embodiment of the disclosure; and FIG. 3 is a schematic cross-sectional structural diagram of an assembly of a mobile terminal, an adapter and an external lens in an embodiment of the disclosure. As shown in FIGS. 1 to 3, an adapter 1 includes a main body structure 11, a first connection structure 112 and a second connection structure 113. The main body structure 11 defines a light passing channel 111, and the first connection structure 112 is provided in the main body structure 11 and located at a first end 1110 of the light passing channel 111, where an external lens 3 is positioned and mounted to the first end 1110 through the first connection structure 112, such that an access plane 32 of the external lens 3 matches with a preset end surface 1111 of the first end 1110. The second connection structure 113 is provided in the main body structure 11 and located at a second end 1112 of the light passing channel 111, where the adapter 1 is positioned and mounted to a mobile terminal 2 through the second connection structure 113, such that a distance d between the preset end surface 1111 and a photosensitive plane 23 of an image sensor assembly 22 is equal to a flange focal length D of the external lens 3.

Because the above adapter 1 includes the first connection structure 112 and the second connection structure 113, the first connection structure 112 can be assembled and matched with the external lens 3, such that the access plane 32 of the external lens 3 matches with the preset end surface 1111 of the light passing channel 111, and the second connection structure 113 can be assembled and matched with the mobile terminal 2, such that the distance d between the preset end surface 1111 and the photosensitive plane 23 is equal to the flange focal length D of the external lens 3. The above structural arrangement achieves a positioning connection between the external lens 3 and the mobile terminal 2 through the first connection structure 112 and the second connection structure 113 of the adapter 1, such that the external lens 3 can achieve an expected shooting performance after being mounted to the mobile terminal 2, and such that the mobile terminal 2 has both lightness and thinness and an expected shooting effect, and such that the convenience of mounting the external lens 3 is further improved.

Figure 4:
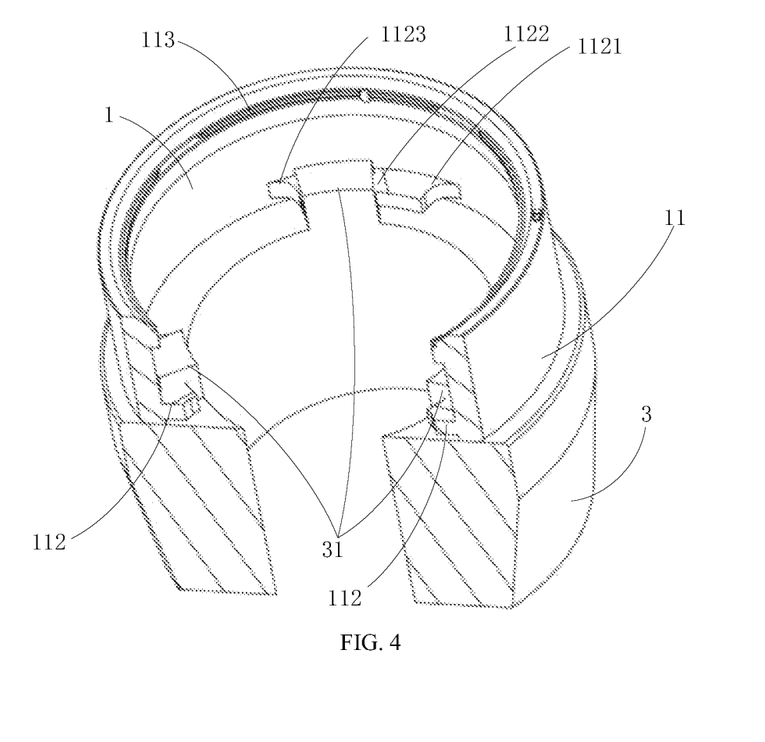
FIG. 4 is a schematic partial cross-sectional structural diagram of an adapter cooperating with an external lens in an embodiment of the disclosure.
Figure 5:
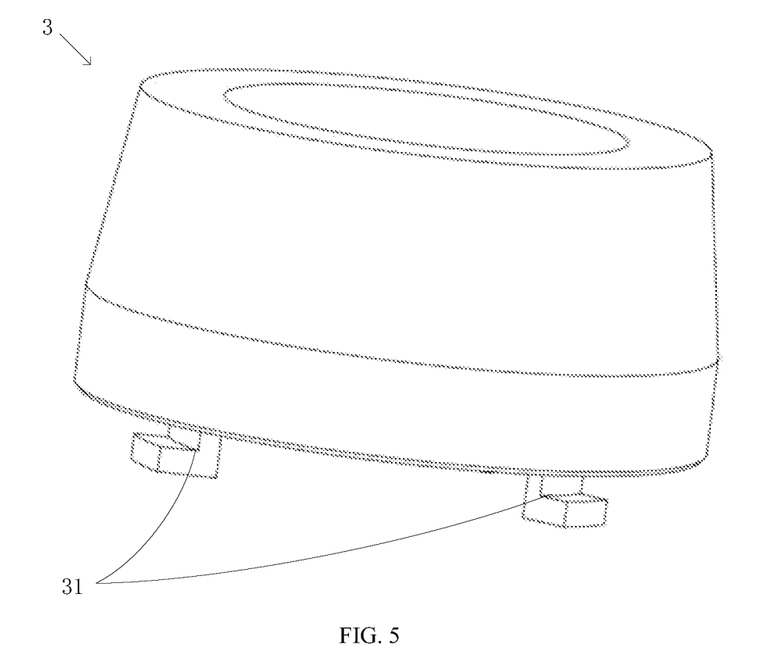
FIG. 5 is a schematic stereoscopic structural diagram of an external lens in an embodiment of the disclosure.

In some embodiments, as shown in FIGS. 1, 4 and 5, the first connection structure 112 includes at least one limiting boss provided in the main body structure 11, the limiting boss includes a guide plane 1121 and a fastening inclined plane 1122 connected to the guide plane 1121 along the circumference of the main body structure 11; and a clamping structure 31 of the external lens 3 is capable of rotationally sliding from the guide plane 1121 to the fastening inclined plane 1122 and being fixed to the fastening inclined plane 1122 at a limiting position.

The adapter 1 and the external lens 3 may be assembled through counter rotation, and during the rotation assembly, the clamping structure 31 of the external lens 3 may rotationally slide from the guide plane 1121 to the fastening inclined plane 1122 and be fixed to the fastening inclined plane 1122 at a limiting position through abutment. The guide plane 1121 can play a role in leading in the external lens 3 to facilitate smooth lead-in of the external lens 3. The fastening inclined plane 1122 can, by means of its own inclined structure, gradually tightly abut against the clamping structure 31, such that the external lens 3 is clamped with and fixed to the adapter 1.

In the above embodiment, the limiting boss may further include a stop structure 1123, and the fastening inclined plane 1122 includes a first end portion 11221 and a second end portion 11222 that are provided opposite to each other, where the first end portion 11221 is connected to the guide plane 1121, and the stop structure 1123 is provided at the second end portion 11222. That is, the stop structure 1123 is provided at an end of the fastening inclined plane 1122, so as to prevent the clamping structure 31 of the external lens 3 from sliding out along the fastening inclined plane 1122.

The stop structure 1123 may include a protrusion structure formed with respect to the fastening inclined plane 1122, so as to use a bent surface formed by the protrusion structure with respect to the fastening inclined plane 1122 to achieve a stop of the clamping structure 31 of the external lens 3. In another embodiment, the stop structure 1123 may also be an extension inclined plane connected to the fastening inclined plane 1122, and an inclination angle of the extension inclined plane prevents an external connection structure of the external lens 3 from continuing to slide, so as to achieve a stop effect.

It should be noted that the clamping structure 31 of the external lens 3 may be a clamping hook provided in the external lens 3, and the clamping hook is hooked on the limiting boss and cooperates with the guide plane 1121, the fastening inclined plane 1122 and the stop structure 1123 formed on an upper surface of the limiting boss.

Figure 6:
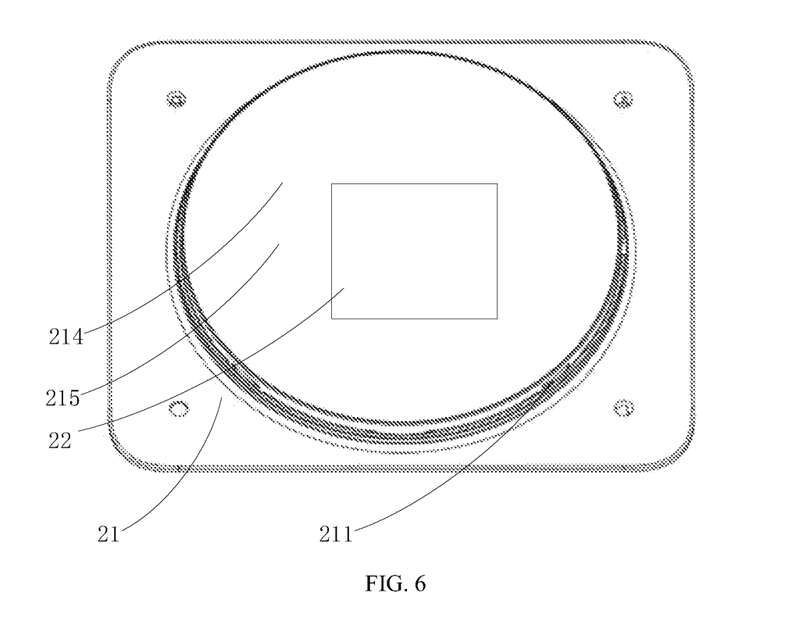
FIG. 6 is a first schematic partial structural diagram of a mobile terminal in an embodiment of the disclosure.

In some embodiments, as shown in FIGS. 1 and 6, the second connection structure 113 may include at least one clamping slot provided on an inner wall of the main body structure 11, where the clamping slot is provided along the circumference of the main body structure 11. One end of the clamping slot may be provided with a rotation stop end surface 1134, and the mobile terminal 2 is provided with a clamping block 211 structurally matching the clamping slot. When the adapter 1 is assembled to the mobile terminal 2, the clamping block 211 is received in the clamping slot, the clamping block 211 is in a sliding fit with the clamping slot, and the clamping block 211 can slide, opposing the clamping slot, to the rotation stop end surface 1134 to complete fixing at a limiting position. Through the sliding fit between the clamping block 211 and the clamping slot, the convenience of connecting the adapter 1 to the mobile terminal 2 is improved, and when the adapter 1 is assembled and matched with the mobile terminal 2, the clamping block 211 is directly aligned with the clamping slot and then screwed in.

It should be noted that the arrangement of the clamping block 211 provided in the mobile terminal 2 helps to simplify structural improvement of the mobile terminal 2 and reduce a cost of the structural improvement.

Of course, the embodiments of arranging the clamping block 211 in the main body structure 11 and arranging the clamping slot on the mobile terminal 2 also belong to the protection scope of the present disclosure.

Figure 7:
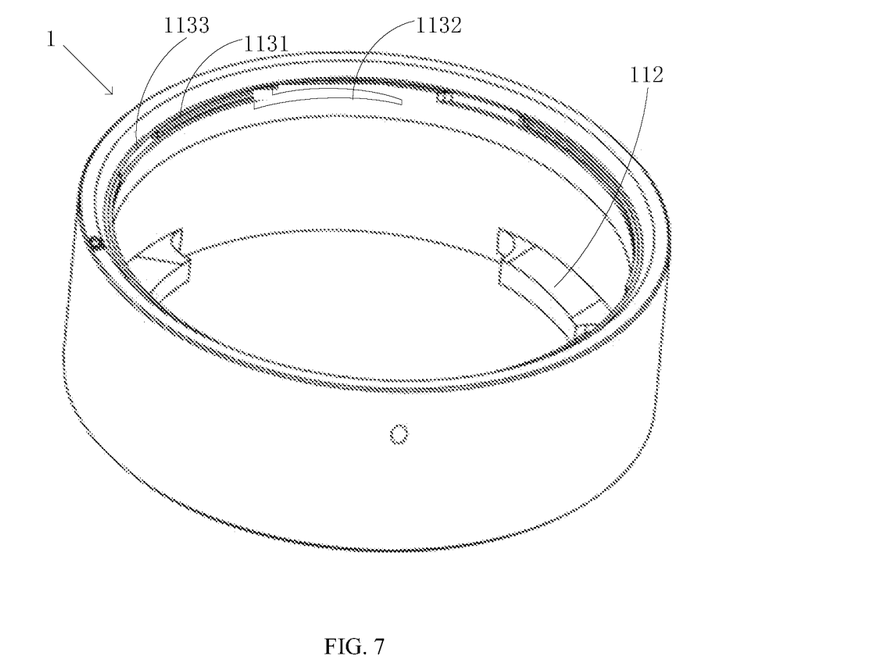
FIG. 7 is a second schematic structural diagram of an adapter in an embodiment of the disclosure.
Figure 8:
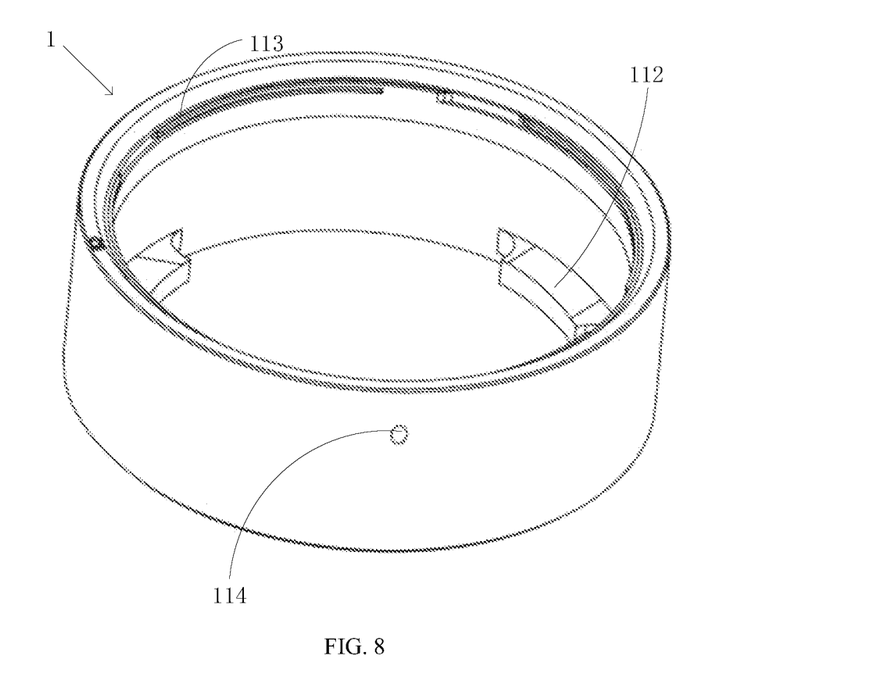
FIG. 8 is a third schematic structural diagram of an adapter in an embodiment of the disclosure.
Figure 9:
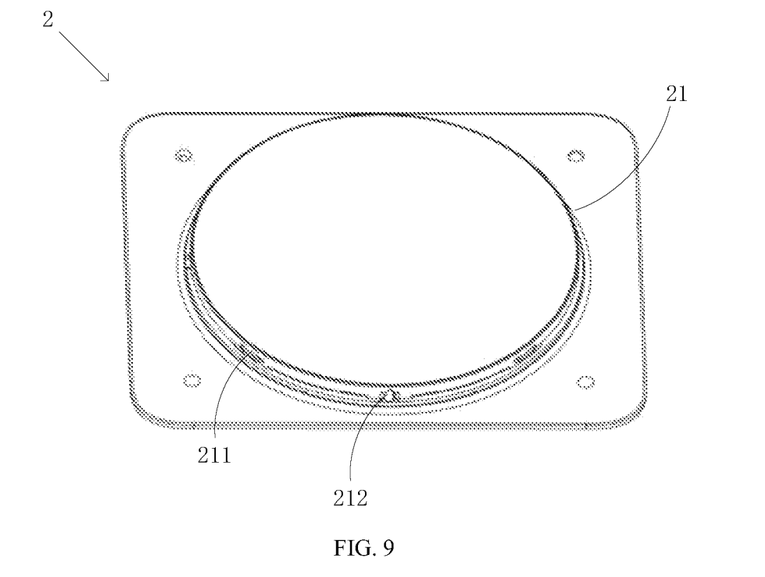
FIG. 9 is a second schematic partial structural diagram of a mobile terminal in an embodiment of the disclosure.
Figure 10:
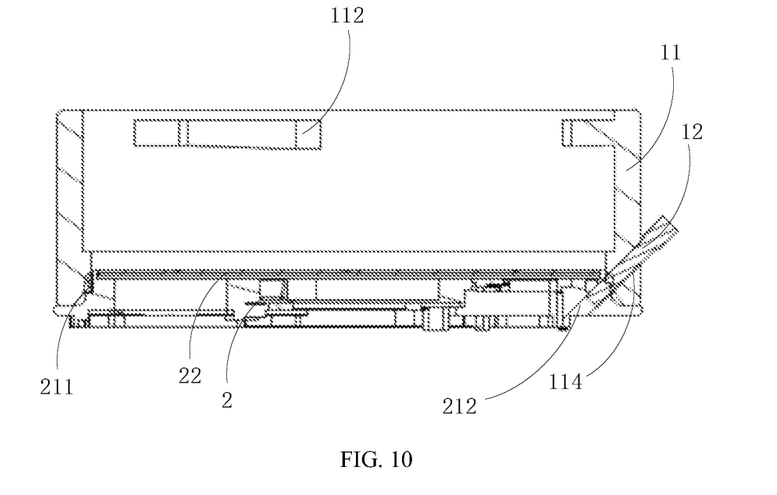
FIG. 10 is a schematic partial cross-sectional structural diagram of an adapter cooperating with a mobile terminal in an embodiment of the disclosure.
Figure 11:
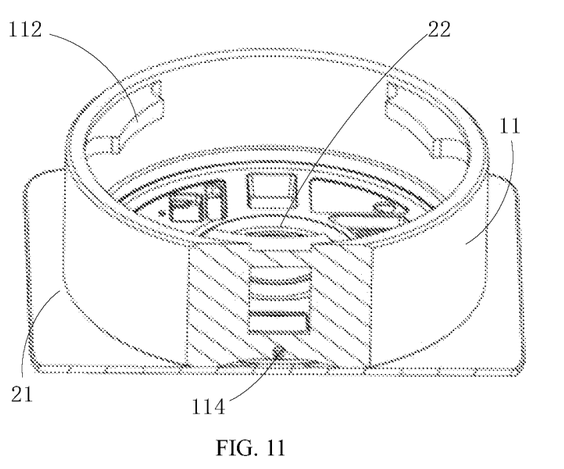
FIG. 11 is a schematic partial cross-sectional structural diagram of an adapter cooperating with a mobile terminal in another embodiment of the disclosure.

In the above embodiment, as shown in FIG. 7, the clamping slot may include a lead-in slot 1131 and a limiting slot 1132 connected to the lead-in slot 1131, where the limiting slot 1132 is at a deeper position in the light passing channel 111 than is the lead-in slot 1131 in the light passing channel 111. That is, in the depth direction of the light passing channel 111, the lead-in slot 1131 is closer to the second end of the light passing channel 111 than the limiting slot 1132. The clamping block 211 may be led into the clamping slot through the lead-in slot 1131, and clamping and fixing are achieved when the clamping block 211 slides into the limiting slot 1132, such that smooth and stable cooperation between the adapter 1 and the mobile terminal 2 is improved.

In the above embodiment, projections of at least part of the lead-in slot 1131 and at least part of the limiting slot 1132 are coincident in the depth direction of the light passing channel 111, such that sliding from the lead-in slot 1131 into the limiting slot 1132 only needs a movement in a region where the projections coincide and in the depth direction of the light passing channel 111, thus improving the convenience and fluency of operation.

In this embodiment, the size of the region where the projections coincide in the circumference direction is greater than or equal to the size of the clamping block 211, so as to avoid jamming when passing through the region where the projections coincide.

In some embodiments, one end of the lead-in slot 1131 away from the limiting slot 1132 may be provided with a slot inlet 1133, and the width of the slot inlet 1133 in the depth direction of the light passing channel 111 should be greater than or equal to the width of the lead-in slot 1131, so as to facilitate sliding-in of the clamping block 211.

Further, the size of the slot inlet 1133 in the circumference direction should also be greater than or equal to the size of the clamping block 211, so as to accommodate the clamping block 211 before rotation.

In other embodiments, as shown in FIGS. 8 to 11, the adapter 1 may further include a threaded connection member 12, the main body structure 11 is provided with a first threaded hole 114, the mobile terminal 2 is provided with a second threaded hole 212 positionally corresponding to the first threaded hole 114, and the threaded connection member 12 is respectively in a fastening fit with the first threaded hole 114 and the second threaded hole 212. Fixing the adapter 1 to the mobile terminal 2 through the threaded connection member 12 improves the ease and reliability of connection.

When the clamping block 211 of the mobile terminal 2 slides into the clamping slot, the limiting in the depth direction of the light passing channel 111 is achieved, and then the circumferential limiting of the adapter 1 may be achieved through cooperation of the threaded connection member 12 with the mobile terminal 2 and the adapter 1 respectively, thereby completing a fixed connection between the adapter 1 and the mobile terminal 2.

In the above embodiment, the first threaded hole 114 may be obliquely provided with respect to the depth direction of the light passing channel 111, such that the length of the first threaded hole 114 is greater than the thickness of the main body structure 11. The obliquely provided first threaded hole 114 increases the depth of the threaded hole, thus enhancing the reliability of connection during the connection.

The second threaded hole 212 cooperating with the first threaded hole 114 may also be obliquely provided with respect to the depth direction of the light passing channel 111, such that the depth of the second threaded hole 212 in the mobile terminal 2 increases, further improving the reliability of connection.

Figure 12:
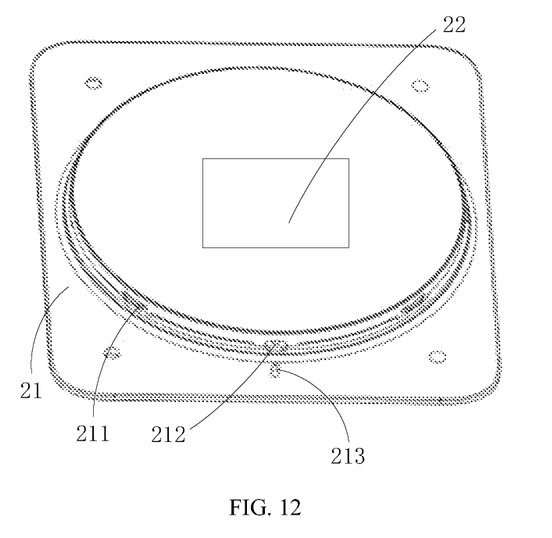
FIG. 12 is a third schematic partial structural diagram of a mobile terminal in an embodiment of the disclosure.

In further other embodiments, as shown in FIGS. 1 and 12, the main body structure 11 may be provided with a limiting sliding slot 115, where a stop recess 1151 is provided in the limiting sliding slot 115; and the mobile terminal 2 is provided with a telescopic limiting member 213 positionally corresponding to the limiting sliding slot 115. In a process of assembling the adapter 1 to the mobile terminal 2, the telescopic limiting member 213 elastically abuts against the limiting sliding slot 115 and slides along the limiting sliding slot 115 to be in a limiting fit with the stop recess 1151. Through abutting and sliding of the telescopic limiting member 213 and the limiting sliding slot 115, the telescopic limiting member 213 slides into the stop recess 1151 to limit a position of the adapter 1 and the mobile terminal 2, such that the sliding fluency and the manual operation feeling are improved. The withdrawal of the telescopic limiting member 213 is further prevented by the friction between the telescopic limiting member 213 and the stop recess 1151 or the limiting sliding slot 115.

When there is a need to remove the adapter 1, a force in an opposite direction may be applied to the adapter 1, such that the adapter 1 may be unscrewed by overcoming the friction between the telescopic limiting member 213 and the stop recess 1151 and the limiting sliding slot 115.

In the above embodiment, a bottom surface of the limiting sliding slot 115 includes an extension surface provided with respect to the depth direction of the light passing channel 111, and the above obliquely provided extension surface is used to provide a guide for sliding-in and sliding-out of the telescopic limiting member 213, such that movement of the telescopic limiting member 213 is smooth.

The telescopic limiting member 213 may include an elastic member and an abutment structure connected to the elastic member, and in the process of assembling the adapter 1 to the mobile terminal 2, the abutment structure elastically abuts against the limiting sliding slot 115 and slides along the limiting sliding slot 115 to be in a limiting fit with the stop recess 1151, so as to use compression and reset properties of the elastic member to obtain a limiting effect, improving the manual operation feeling.

Figure 13:
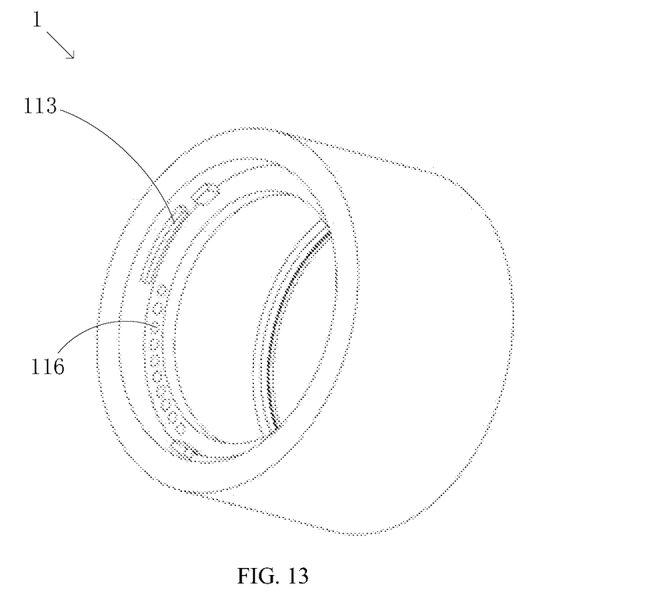
FIG. 13 is a fourth schematic structural diagram of an adapter in an embodiment of the disclosure.

In some embodiments, as shown in FIG. 13, the main body structure 11 may be provided with first conductive contacts and second conductive contacts 116, where the first conductive contacts are electrically connected to a main board of the mobile terminal 2, and the second conductive contacts 116 are electrically connected to the external lens 3. The external lens 3 may include functions such as auto-focusing and anti-shake, and after the mobile terminal 2 and the external lens 3 are electrically connected through the adapter 1, a control signal or a feedback signal may be transmitted to each other, so as to use the functions such as auto-focusing and anti-shake of the external lens 3 to achieve focusing and anti-shake, and improve the focusing and anti-shake effects of the mobile terminal 2.

Figure 14:
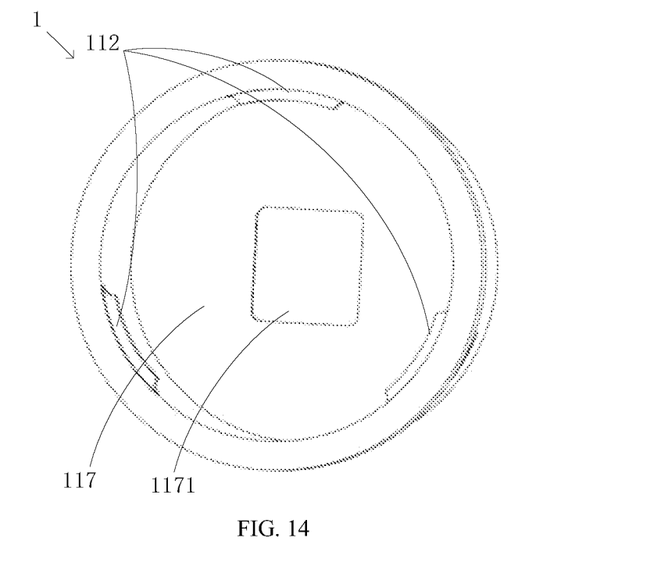
FIG. 14 is a fifth schematic structural diagram of an adapter in an embodiment of the disclosure.

In some embodiments, as shown in FIG. 14, a side of the main body structure 11 facing the mobile terminal 2 is provided with a light shielding structure 117, where the light shielding structure 117 is provided with a light transmitting opening 1171, the light transmitting opening 1171 matching a structural shape and size of a photosensitive main body of the image sensor assembly 22. The light transmitting opening 1171 of the adapter 1 may enable the light passing through the external lens 3 to be propagated to the photosensitive main body of the image sensor assembly 22 through the light transmitting opening 1171, and the light transmitting opening 1171 matching the structural shape and size of the photosensitive main body, may prevent external stray light from entering the image sensor assembly 22 and affecting an imaging effect. For example, when the photosensitive main body is rectangular, the above light transmitting opening 1171 may be rectangular, thus matching the photosensitive main body, such that after the external lens 3 is assembled to the mobile terminal 2, the photosensitive main body may obtain better light passing and imaging effects.

Figure 15:
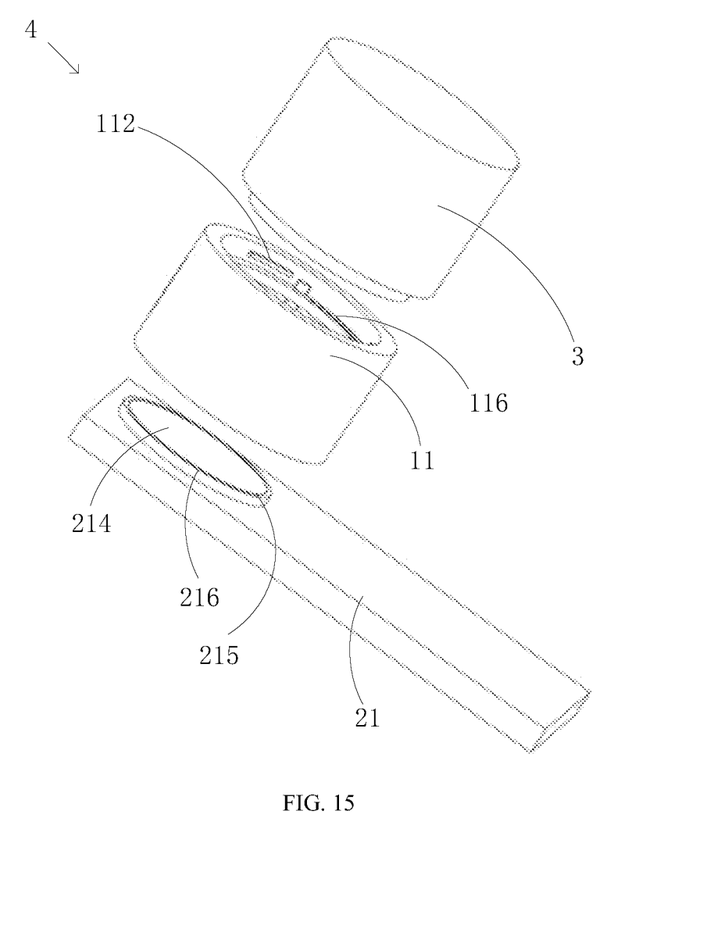
FIG. 15 is a schematic exploded structural diagram of a mobile terminal, an adapter and an external lens in an embodiment of the disclosure.

The disclosure further provides a mobile device 4, and as shown in FIGS. 2 and 15, the mobile device 4 includes the external lens 3, the mobile terminal 2 and the above adapter 1 in different embodiments. The external lens 3 is positioned and mounted to the first end 1110 through the first connection structure 112, such that the access plane 32 of the external lens 3 matches with the preset end surface 1111 of the first end 1110. The mobile terminal 2 includes a device housing 21 and the image sensor assembly 22, wherein the device housing 21 includes a light transmitting portion 214 and an external connection portion 216. An assembly space 215 positionally corresponding to the light transmitting portion 214 is provided in the device housing 21, and the image sensor assembly 22 is provided in the assembly space 215. The second connection structure 113 is positioned and assembled with the external connection portion 216, such that the photosensitive main body of the image sensor assembly 22 positionally corresponds to the light passing channel 111, and the distance d between the preset end surface 1111 and the photosensitive plane 23 of the image sensor assembly 22 is equal to the flange focal length D of the external lens 3.

It should be noted that the above external connection portion 216 may be a structure such as the above clamping block 211, the second threaded hole 212 and the telescopic limiting member 213 that are provided in the device housing 21.

Through the adapter 1, the external lens 3 is enabled to have a matched flange focal length D after being mounted to the mobile terminal 2, so as to achieve a shooting function of the external lens 3. The adapter 1 may be provided with a plurality of second connection structures 113 matching flange focal lengths D of different external lenses 3, such that an external lens 3 having different flange focal lengths D can be mounted to the mobile terminal 2, and can focus and be used normally. Different external lenses 3 may also be provided with an adapter 1 in a one-to-one correspondence, such that after a second connection structure 113 of each adapter 1 is positioned and mounted to an external lens 3, a flange focal length D matching the external lens 3 is obtained.

Because the adapter 1 includes the first connection structure 112 and the second connection structure 113, the first connection structure 112 can be assembled and matched with the external lens 3, such that the access plane 32 of the external lens 3 matches with the preset end surface 1111 of the light passing channel 111, and the second connection structure 113 can be assembled and matched with the mobile terminal 2, such that the distance d between the preset end surface 1111 and the photosensitive plane 23 is equal to the flange focal length D of the external lens 3. The above structural arrangement achieves a positioning connection between the external lens 3 and the mobile terminal 2 through the first connection structure 112 and the second connection structure 113 of the adapter 1, such that the external lens 3 can achieve an expected shooting performance after being mounted to the mobile terminal 2, thus the mobile terminal 2 has both lightness and thinness and an expected shooting effect, and thus the convenience of mounting the external lens 3 is further improved.

In the above mobile device 4, as the assembly of the external lens 3 no longer occupies an internal space of the mobile terminal 2, and the main board of the mobile terminal 2 is no longer limited by the size of the lens, a wider layout area may be obtained, and a heat dissipation effect and the integrity of a transmitted signal are improved. Moreover, the internal space of the mobile terminal 2 saved by externally connecting the lens, can also be used to improve a battery capacity and increase the endurance of the mobile terminal 2.

The distance between the photosensitive main body of the image sensor assembly 22 and the light transmitting portion 214 of the device housing 21 is relatively small, e.g., the distance may be less than or equal to 10 mm, and thus the mobile terminal can be adapted to almost all commonly used lenses in the market, and a photography enthusiast can adapt various lenses to one mobile terminal 2, such that the photographing experience is improved. A conventional lens may also function relying on the above mobile terminal 2, and the mobile terminal 2 itself may also be used as a professional photography tool in addition to a communication function and therefore have a higher value.

It should be noted that the mobile terminal 2 may be a mobile phone, a tablet computer, a wearable device, etc., and is not limited by the disclosure examples. In some examples, the mobile terminal 2 is a mobile phone, and the mobile phone has a high computing power platform, high-efficiency and high-quality image algorithms, and convenient editing and sharing functions. After collecting light by the assembly of the external lens 3 and imaging by the image sensor assembly 22, the mobile phone can be directly used to perform image processing, editing and sharing, such that a convenient image system is obtained, and thus when a camera with a high imaging quality is separately used, an image need not be transferred out and then processed, in order to be edited and shared.

For example, in scenarios such as traveling, professional photography and interview video recording, in addition to carrying a daily used camera lens, there is no longer a need to carry a heavy camera body, and only the camera lens and the mobile terminal 2 need to be assembled for use, and can be disassembled after use, thereby improving the portability and the convenience of use.

Because selection of the external lens 3 assembly is no longer limited by an assembly space of the mobile terminal 2, the external lens 3 can be matched with an imaging size of the image sensor assembly 22 to the greatest extent, and many performances such as an aperture, a light inlet amount and resolution power can be improved. For example, when shooting is performed in dark scenarios such as at night, a dark room, a cave, and a tunnel, an external lens 3 with a large diameter and aperture can be selected, combined with algorithms of the mobile terminal 2 such as exposure and fusion, so as to obtain a better dark state scenario photo and improve the user experience.

In another example, a photography enthusiast can, according to a shooting scenario and a shooting requirement, externally connect lens of a single-lens reflex camera, a micro-single digital camera or a film camera, such as a telephoto portrait lens, an extra-wide angle landscape lens, a large aperture lens, and a cinema lens. The above external lens 3 cooperates with the built-in image sensor assembly 22 of the mobile terminal 2 to complete functions such as shooting and video recording, such that the picture and video shooting quality can be improved. The above mobile terminal 2 can also be externally connected to some old lenses collected by the photography enthusiast that have a camera body image field distance which is difficult to match, so as to improve the practicability of the old lenses.

Because the image sensor assembly 22 of the mobile terminal 2 is smaller than a conventional camera image sensor, equivalent conversion needs to be performed on a lens focal length when the mobile terminal 2 is adapted to external lenses 3 of different specifications. For example, the size of the image sensor assembly 22 of the mobile terminal 2 is 1 inch, and a diagonal line length ratio of an image sensor of a full-frame camera to the image sensor assembly 22 of the mobile terminal in the disclosure is 43.27/16=2.7, where 2.7 is a focal length conversion coefficient of an external lens 3 of the full-frame camera. When a full-frame external lens 3 with a focal length of 50 mm is used, an equivalent focal length is 50 mm*2.7=135 mm. Similarly, when the mobile terminal is adapted to an APS-C frame camera lens, a focal length conversion coefficient is 28.3/16=1.77. When the mobile terminal is adapted to a ⁴⁄₃-inch camera lens, a focal length conversion coefficient is 22.4/16=1.4. According to the above focal length conversion coefficients, corresponding external lenses 3 can be selected according to a shooting scenario.

The descriptions above are merely examples of the disclosure and are not intended to limit the disclosure. Any modification, equivalent replacement and improvement made within the spirits and principles of the disclosure shall all be included in the protection scope of the disclosure.

Embodiments

A first embodiment includes an adapter, used for detachably assembling an external lens to a mobile terminal to make the external lens cooperate with an image sensor assembly of the mobile terminal for use, the adapter includes:
  a main body structure defining a light passing channel;
  a first connection structure, provided in the main body structure and located at a first end of the light passing channel, and used for positioning and mounting the external lens to the first end, such that an access plane of the external lens matches with a preset end surface of the first end; and
  a second connection structure, provided in the main body structure and located at a second end of the light passing channel, and used for positioning and mounting the adapter to the mobile terminal, such that a distance between the preset end surface and a photosensitive plane of the image sensor assembly is equal to a flange focal length of the external lens.

A second embodiment includes the adapter of the first embodiment, in which the first connection structure includes at least one limiting boss provided in the main body structure, the limiting boss includes a guide plane and a fastening inclined plane connected to the guide plane along the circumference of the main body structure; and a clamping structure of the external lens is capable of rotationally sliding from the guide plane to the fastening inclined plane and being fixed to the fastening inclined plane at a limiting position.

A third embodiment includes the adapter of the second embodiment, in which the limiting boss further comprises a stop structure, and the fastening inclined plane includes a first end portion and a second end portion opposite to the first end portion, the first end portion is connected to the guide plane, and the stop structure is provided at the second end portion.

A fourth embodiment includes the adapter of the third embodiment, in which the stop structure includes a protrusion structure formed with respect to the fastening inclined plane.

A fifth embodiment includes the adapter of the first embodiment, in which the second connection structure includes at least one clamping slot provided on an inner wall of the main body structure, the clamping slot is provided along the circumference of the main body structure; and
  the mobile terminal is provided with a clamping block structurally matched with the clamping slot, and when the adapter is assembled to the mobile terminal, the clamping block is received in the clamping slot, and the clamping block is in a sliding fit with the clamping slot.

A sixth embodiment includes the adapter of the fifth embodiment, in which the clamping slot includes a lead-in slot and a limiting slot connected to the lead-in slot, in the depth direction of the light passing channel, the lead-in slot is closer to the second end of the light passing channel than the limiting slot.

A seventh embodiment includes the adapter of the sixth embodiment, in which a projection of at least part of the lead-in slot and at least part of the limiting slot is coincident in the depth direction of the light passing channel.

An eighth embodiment includes the adapter of the fifth embodiment, further includes a threaded connection member, wherein the main body structure is provided with a first threaded hole, the mobile terminal is provided with a second threaded hole positionally corresponding to the first threaded hole, and the threaded connection member is respectively in a fastening fit with the first threaded hole and the second threaded hole.

A ninth embodiment includes the adapter of the eighth embodiment, in which the first threaded hole is obliquely provided with respect to the depth direction of the light passing channel, such that the length of the first threaded hole is greater than the thickness of the main body structure.

A tenth embodiment includes the adapter of the fifth embodiment, in which the main body structure is provided with a limiting sliding slot, a stop recess is provided in the limiting sliding slot, and the mobile terminal is provided with a telescopic limiting member positionally corresponding to the limiting sliding slot; and in a process of assembling the adapter to the mobile terminal, the telescopic limiting member elastically abuts against the limiting sliding slot and slides along the limiting sliding slot to be in a limiting fit with the stop recess.

An eleventh embodiment includes the adapter of the tenth embodiment, in which a bottom surface of the limiting sliding slot includes an extension surface provided with respect to the depth direction of the light passing channel.

A twelfth embodiment includes the adapter of the tenth embodiment, in which the telescopic limiting member includes an elastic member and an abutment structure connected to the elastic member; in the process of assembling the adapter to the mobile terminal, the abutment structure elastically abuts against the limiting sliding slot and slides along the limiting sliding slot to be in a limiting fit with the stop recess.

A thirteenth embodiment includes the adapter of the first embodiment, in which the main body structure is provided with first conductive contacts and second conductive contacts, the first conductive contacts are electrically connected to a main board of the mobile terminal, and the second conductive contacts are electrically connected to the external lens.

A fourteenth embodiment includes the adapter of the first embodiment, in which a side of the main body structure facing the mobile terminal is provided with a light shielding structure, the light shielding structure being provided with a light transmitting opening matching a structural shape and size of a photosensitive main body of the image sensor assembly.

A fifteenth embodiment includes a mobile device, including an external lens, a mobile terminal, and the adapter according to any one of the first to fourteen embodiments, in which the external lens is positioned and mounted to the first end through the first connection structure, such that the access plane of the external lens matches with the preset end surface of the first end;

the mobile terminal includes a device housing and an image sensor assembly, in which the device housing includes a light transmitting portion and an external connection portion, an assembly space positionally corresponding to the light transmitting portion is provided in the device housing, and the image sensor assembly being provided in the first assembly space; and the second connection structure is positioned and assembled with the external connection portion, such that the photosensitive main body of the image sensor assembly positionally corresponds to the light passing channel, and the distance between the preset end surface and the photosensitive plane of the image sensor assembly is equal to the flange focal length of the external lens.

What is claimed is:

1. An adapter, used for detachably assembling an external lens to a mobile terminal to make the external lens cooperate with an image sensor assembly of the mobile terminal for use, wherein the adapter comprises:

a main body structure defining a light passing channel;

a first connection structure, provided in the main body structure and located at a first end of the light passing channel, and used for positioning and mounting the external lens to the first end, such that an access plane of the external lens matches with a preset end surface of the first end; and a second connection structure, provided in the main body structure and located at a second end of the light passing channel, and used for positioning and mounting the adapter to the mobile terminal, such that a distance between the preset end surface and a photosensitive plane of the image sensor assembly is equal to a flange focal length of the external lens, wherein:

the second connection structure comprises at least one clamping slot provided on an inner wall of the main body structure, wherein the clamping slot is provided along a circumference of the main body structure; and the mobile terminal is provided with a clamping block structurally matched with the clamping slot, and when the adapter is assembled to the mobile terminal, the clamping block is received in the clamping slot, and the clamping block is in a sliding fit with the clamping slot.

2. The adapter according to claim 1, wherein the first connection structure comprises at least one limiting boss provided in the main body structure, wherein the limiting boss comprises a guide plane and a fastening inclined plane connected to the guide plane along the circumference of the main body structure; and a clamping structure of the external lens is capable of rotationally sliding from the guide plane to the fastening inclined plane and being fixed to the fastening inclined plane at a limiting position.

3. The adapter according to claim 2, wherein the limiting boss further comprises a stop structure, and the fastening inclined plane comprises a first end portion and a second end portion opposite to the first end portion, wherein the first end portion is connected to the guide plane, and the stop structure is provided at the second end portion.

4. The adapter according to claim 3, wherein the stop structure comprises a protrusion structure formed with respect to the fastening inclined plane.

5. The adapter according to claim 1, wherein the clamping slot comprises a lead-in slot and a limiting slot connected to the lead-in slot, in a depth direction of the light passing channel, the lead-in slot is closer to the second end of the light passing channel than the limiting slot.

6. The adapter according to claim 5, wherein a projection of at least part of the lead-in slot and at least part of the limiting slot is coincident in the depth direction of the light passing channel.

7. The adapter according to claim 1, wherein the adapter further comprises a threaded connection member, and the main body structure is provided with a first threaded hole, wherein the mobile terminal is provided with a second threaded hole positionally corresponding to the first threaded hole, and the threaded connection member is respectively in a fastening fit with the first threaded hole and the second threaded hole.

8. The adapter according to claim 7, wherein the first threaded hole is obliquely provided with respect to a depth direction of the light passing channel, such that the length of the first threaded hole is greater than a thickness of the main body structure.

9. The adapter according to claim 1, wherein the main body structure is provided with a limiting sliding slot, wherein a stop recess is provided in the limiting sliding slot, and the mobile terminal is provided with a telescopic limiting member positionally corresponding to the limiting sliding slot; wherein in a process of assembling the adapter to the mobile terminal, the telescopic limiting member elastically abuts against the limiting sliding slot and slides along the limiting sliding slot to be in a limiting fit with the stop recess.

10. The adapter according to claim 9, wherein a bottom surface of the limiting sliding slot comprises an extension surface provided obliquely with respect to a depth direction of the light passing channel.

11. The adapter according to claim 9, wherein the telescopic limiting member comprises an elastic member and an abutment structure connected to the elastic member; wherein in the process of assembling the adapter to the mobile terminal, the abutment structure elastically abuts against the limiting sliding slot and slides along the limiting sliding slot to be in a limiting fit with the stop recess.

12. The adapter according to claim 1, wherein the main body structure is provided with first conductive contacts and second conductive contacts, the first conductive contacts are electrically connected to a main board of the mobile terminal, and the second conductive contacts are electrically connected to the external lens.

13. The adapter according to claim 1, wherein a side of the main body structure facing the mobile terminal is provided with a light shielding structure, wherein the light shielding structure is provided with a light transmitting opening matching a structural shape and a size of a photosensitive main body of the image sensor assembly.

14. A mobile device, comprising:
an external lens,
a mobile terminal, and
an adapter that detachably couples the external lens to the mobile terminal to make the external lens cooperate with an image sensor assembly of the mobile terminal for use, the adapter comprises:
  a main body structure, wherein the main body structure defines a light passing channel;
  a first connection structure, provided in the main body structure and located at a first end of the light passing channel, and used for positioning and mounting the external lens to the first end, such that an access plane of the external lens matches with a preset end surface of the first end; and
  a second connection structure, provided in the main body structure and located at a second end of the light passing channel, and used for positioning and mounting the adapter to the mobile terminal, such that a distance between the preset end surface and a photosensitive plane of the image sensor assembly is equal to a flange focal length of the external lens;
wherein:
  the external lens is positioned and mounted to the first end through the first connection structure, such that the access plane of the external lens matches with the preset end surface of the first end,
  the mobile terminal comprises a device housing and the image sensor assembly, wherein the device housing comprises a light transmitting portion and an external connection portion, and an assembly space positionally corresponding to the light transmitting portion is provided in the device housing, the image sensor assembly being provided in the assembly space,
  the second connection structure is positioned and assembled with the external connection portion, such that a photosensitive main body of the image sensor assembly positionally corresponds to the light passing channel, and the distance between the preset end surface and the photosensitive plane of the image sensor assembly is equal to the flange focal length of the external lens,
  the second connection structure comprises at least one clamping slot provided on an inner wall of the main body structure, wherein the clamping slot is provided along a circumference of the main body structure; and
  the mobile terminal is provided with a clamping block structurally matched with the clamping slot, and when the adapter is assembled to the mobile terminal, the clamping block is received in the clamping slot, and the clamping block is in a sliding fit with the clamping slot.

15. The mobile device according to claim 14, wherein the first connection structure comprises at least one limiting boss provided in the main body structure, the limiting boss comprising a guide plane and a fastening inclined plane connected to the guide plane which are provided along the circumference of the main body structure; and a clamping structure of the external lens rotationally slides from the guide plane to the fastening inclined plane and is fixed to the fastening inclined plane at a limiting position.

16. The mobile device according to claim 15, wherein the limiting boss further comprises a stop structure, and the fastening inclined plane comprises a first end portion and a second end portion that are provided opposite to each other, the first end portion being connected to the guide plane, and the stop structure being provided at the second end portion.

17. The mobile device according to claim 14, wherein the clamping slot comprises a lead-in slot and a limiting slot connected to the lead-in slot, in a depth direction of the light passing channel, the lead-in slot is closer to the second end of the light passing channel than the limiting slot.

18. The mobile device according to claim 17, wherein a projection of at least part of the lead-in slot and at least part of the limiting slot is coincident in the depth direction of the light passing channel.

* * * * *

UNITED STATES PATENT AND TRADEMARK OFFICE
CERTIFICATE OF CORRECTION

| | | |
|---|---|---|
| PATENT NO. | : 12,323,543 B2 | Page 1 of 1 |
| APPLICATION NO. | : 17/825776 | |
| DATED | : June 3, 2025 | |
| INVENTOR(S) | : Zongbao Yang et al. | |

It is certified that error appears in the above-identified patent and that said Letters Patent is hereby corrected as shown below:

On the Title Page

Item (56), under "OTHER PUBLICATIONS", in Column 2, Line 1, delete ""IMAGINGSOURCE" and insert -- "IMAGING SOURCE --, therefor.

Item (56), under "OTHER PUBLICATIONS", in Column 2, Line 2, delete "Coma"" and insert -- COMA" --, therefor.

In the Specification

In Column 1, Line 7, delete "2021116428599," and insert -- 202111642859.9, --, therefor.

Signed and Sealed this
Nineteenth Day of August, 2025

Coke Morgan Stewart
*Acting Director of the United States Patent and Trademark Office*